United States Patent [19]

Honda et al.

[11] Patent Number: 5,701,518
[45] Date of Patent: Dec. 23, 1997

[54] WATERPROOF CAMERA

[75] Inventors: Tsutomu Honda; Hisanori Itoh, both of Sakai; Takuya Ueno, Hashimoto; Junji Mori, Sakai; Hiroyuki Matsumoto, Wakayama; Yasushi Hasegawa, Sakai; Hideo Kajita, Chihayaakasaka-Mura, all of Japan

[73] Assignee: Minolta Co., Ltd., Osaka, Japan

[21] Appl. No.: 598,023

[22] Filed: Feb. 7, 1996

[30] Foreign Application Priority Data

Feb. 10, 1995 [JP] Japan .................................. 7-046554

[51] Int. Cl.$^6$ .......................... G03B 17/08; G03B 17/00
[52] U.S. Cl. .................................... 396/29; 396/529
[58] Field of Search ................. 354/64, 286; 396/25, 396/29, 529, 530, 531, 533

[56] References Cited

U.S. PATENT DOCUMENTS

| | | | |
|---|---|---|---|
| 3,162,106 | 12/1964 | D'Oplinter | 354/64 |
| 4,071,066 | 1/1978 | Schaeffer | 150/52 |
| 4,168,897 | 9/1979 | Gates | 354/286 |
| 4,763,145 | 8/1988 | Takamura et al. | 354/64 |
| 4,963,902 | 10/1990 | Fukahori | 354/64 |
| 4,994,829 | 2/1991 | Tsukamoto | 354/64 |
| 5,077,567 | 12/1991 | Hariguchi et al. | 354/64 |
| 5,177,515 | 1/1993 | Tsukamoto | 354/64 |

FOREIGN PATENT DOCUMENTS 63-280229  11/1988  Japan .

*Primary Examiner*—Safet Metjahic
*Assistant Examiner*—John Chizmar
*Attorney, Agent, or Firm*—Burns, Doane, Swecker & Mathis, LLP

[57] ABSTRACT

A waterproof camera to which an interchangeable lens unit having a waterproof construction is mounted. The waterproof camera has a lens mount provided in a camera body and to which the interchangeable lens unit is removably mounted, a ring-shaped flange provided in the lens mount and which positions the interchangeable lens unit relative to the camera camera body, an engaging member provided at an outer circumference of the ring-shaped flange and which engages with the outer circumference of one end of the interchangeable lens unit, and a waterproof member which is in pressing contact with an area of engagement between the engaging member and the outer circumference of one end of the interchangeable lens unit and prevents water from penetrating in the area of engagement.

23 Claims, 5 Drawing Sheets

WATERPROOF CAMERA

BACKGROUND OF THE INVENTION

1. Field of the Invention

The present invention relates to a waterproof camera, and more specifically to an interchangeable lens-type waterproof camera to which interchangeable lens units may be attached.

2. Description of the Related Arts

A waterproof camera that may be used underwater and accepts interchangeable lens units has conventionally been proposed. Known types of lens mounts for this type of camera include the bayonet-type mount (in which both the interchangeable lens unit and the lens mount of the camera body are equipped with multiple claw-shaped members, and the interchangeable lens unit is fixed to the camera through the engagement of these claw-shaped members) and the screw-type mount (in which the interchangeable lens unit is fixed to the camera body using screws). To fix the position of the interchangeable lens unit relative to the camera body, a ring-shaped flange is attached to the lens mount of the camera body in these types of cameras. An engaging member is mounted on the inner circumference of this flange, and the lens unit is fixed to the camera body by means of the lens unit engaging with this engaging member. Moreover, the connection between the lens unit and the camera body is made waterproof by means of packing comprising an O-ring, etc., attached to the outer circumference of said flange.

However, only special interchangeable lens units designed for attachment to waterproof cameras and having a waterproof construction themselves may be freely attached to and removed from this type of lens mount of the camera body having a waterproof construction as described above, and interchangeable lens units that do not have a waterproof construction may not be attached to said lens mount. Even if such an interchangeable lens unit lacking a waterproof construction could be attached to the camera, the camera as a whole would not be waterproof.

SUMMARY OF THE INVENTION

The main object of the present invention is to provide a waterproof camera that is compatible with both non-waterproof and waterproof lenses, and furthermore in which the camera as a whole is waterproof.

Another object of the present invention is to provide a waterproof camera to which a lens unit not having a waterproof construction may be mounted, and furthermore in which the camera as a whole may be made waterproof merely by adding a simple construction.

These objects of the present invention are achieved by providing the waterproof camera described below.

A waterproof camera to which an interchangeable lens unit having a waterproof construction is mounted, said waterproof camera comprising:

- a lens mount provided in a camera body and to which the interchangeable lens unit is removably mounted;
- a ring-shaped flange provided in the lens mount and which positions the interchangeable lens unit relative to the camera body;
- an engaging member provided at an outer circumference of the ring-shaped flange and which engages with the outer circumference of one end of the interchangeable lens unit, so that the interchangeable lens unit is connected to the camera body; and a waterproof member which is in pressing contact with an area of engagement between said engaging member and the outer circumference of one end of the interchangeable lens unit and prevents water from penetrating in said area of engagement.

These and other objects, advantages and features of the invention will become apparent from the following description thereof taken in conjunction with the accompanying drawings which illustrate a specific embodiment of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
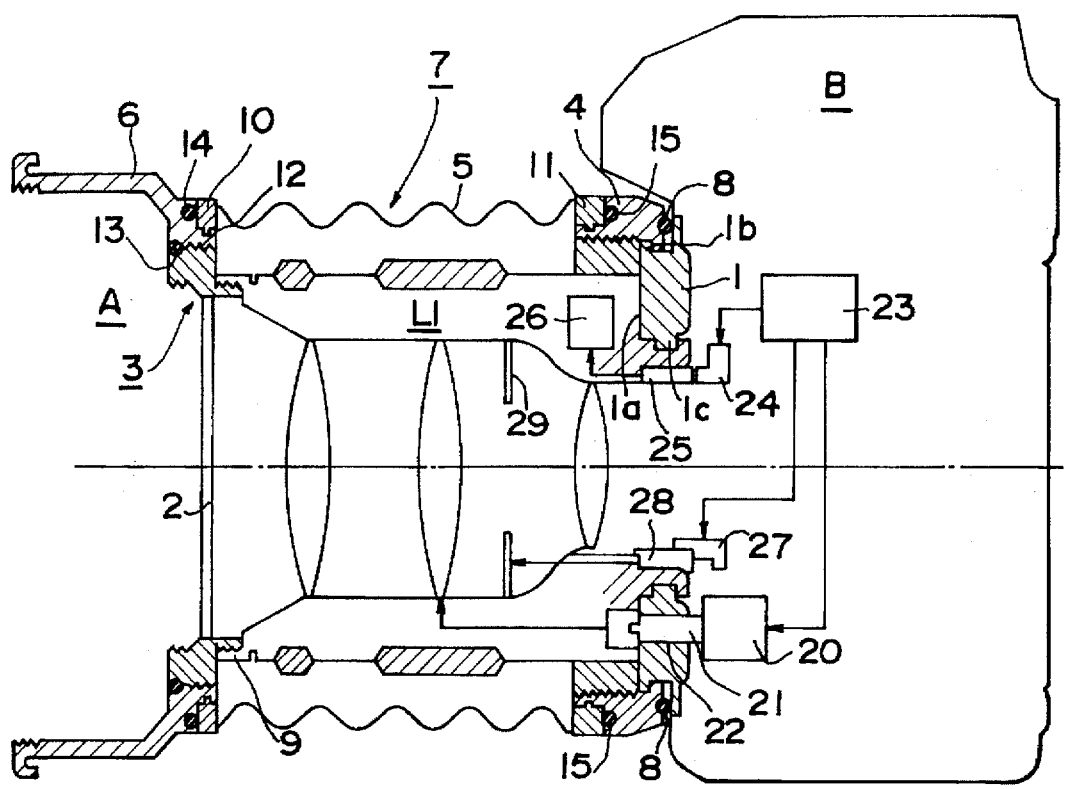
FIG. 1 is a cross-sectional view that shows the construction of a waterproof camera of a first embodiment according to the present invention.

FIG. 1 is a cross-sectional view that shows the construction of a waterproof camera of a first embodiment according to the present invention. Regular interchangeable lens unit (hereinafter referred to as 'lens unit') L1 not having a waterproof construction and waterproofing adapter A are mounted to camera body B having a waterproof construction. Lens mount 1 for mounting lens unit L1 is connected to camera body B. Excluding lens mount 1, camera body B is of a waterproof construction. This lens mount 1 comprises ring-shaped flange 1a, mount 1b attached to the outer circumference of ring-shaped flange 1a to fix the position of lens L1 mounted to camera body B, and mount 1c attached to the inner circumference of ring-shaped flange 1a (See FIG. 2). Lens unit L1 is connected to camera body B by means of mount 1c attached to the inner circumference of flange 1a. Waterproofing adapter A comprises lens adapter unit 3 including protective lens 2, as well as waterproof lens mount 7 comprising waterproof mount 4, waterproof sheet 5 and waterproofing hood 6. Lens adapter unit 3 is connected to screw part 9 for filter attachment located at the front end of lens unit L1. In this way, water is prevented from penetrating from the front lens.

In addition, waterproof mount 4 of waterproof lens mount 7 is connected to mount 1b using the spigot mount method and is fixed in place by rotating the outside of said mount 4.

Figure 3:
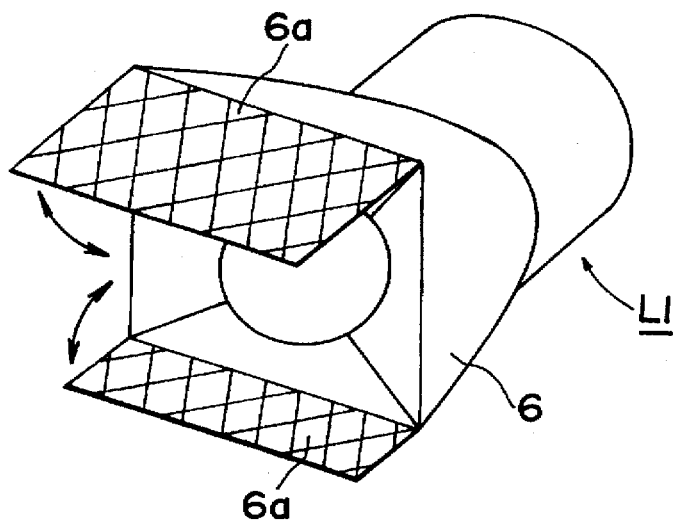
FIG. 3 is a perspective view that shows a modified example of a waterproofing hood that is placed at the front end of an interchangeable lens unit in the waterproof camera as shown in FIG. 1.

Waterproof mount 4 is equipped with packing 8 such as an O-ring. By connecting waterproof mount 4 to mount 1b, penetration of water from lens mount 1 is prevented. Waterproof sheet 5 can expand and contract in response to the expanding and contracting of lens unit L1 during autofocus and zooming operations, and is formed using a sheet of waterproof material comprising an air-permeable waterproof sheet, etc. Waterproof sheet 5 is attached to rotation members 10 and 11 so that it may rotate freely around the optical axis of lens unit L1 when waterproof mount 4 is attached to mount 1b of camera body B and lens unit L1. Moreover, in order to accurately know the operational status of lens unit L1, it is desirable that waterproof sheet 5 be at least partly transparent. A lip is formed on the front end of waterproofing hood 6 such that drops of water do not fall on the surface of protective glass 2 even when the camera is being carried in the rain. A cap (not shown in the drawings) may also be attached to the front end of waterproofing hood 6. Waterproofing hood 6 is attached to screw part 12 of lens adapter unit 3, and has a waterproof construction by means of packing 13 comprised of an O-ring, etc. In addition, rotation members 10 and 11 of waterproof sheet 5 have a waterproof construction by means of packing 14 and 15 respectively attached to said waterproofing hood 6 and waterproof mount 4. By means of these constructions, penetration of water from waterproof lens mount 7 can be prevented. Furthermore, as an alternative means by which drops of water will not fall on protective glass 2, door 6a that comprises two pieces and opens from the middle may be attached to waterproofing hood 6 instead of a cap, as shown in FIG. 3.

The constructions of said camera body B, lens unit L1 and waterproofing adapter A will now be explained in detail below. Motor 20 is mounted on the side of camera body B as a drive source for autofocusing, and the drive shaft for the drive source is linked to the autofocus drive means on the lens unit L1 side through autofocus coupler (transmitting coupler) 21. Autofocus coupler hole 22 is located on flange 1a of lens mount 1 (see FIG. 2). Computing unit 23 mounted on the side of camera body B for performing calculations necessary for autofocusing is connected to computing unit 26 on the lens unit L1 side via communication contact points 24 and 25 that perform communication between camera body B and lens unit L1. Aperture control lever 27 on the camera body B side engages with preset lever 28 on the lens unit L1 side and performs drive control of aperture mechanism 29. Computing unit 23 controls motor 20 and aperture control lever 27.

In the waterproof camera of the first embodiment according to the present invention having the construction described above, a regular interchangeable lens unit is mounted to the camera body by means of the mount attached to the inner circumference of the flange of the lens mount of camera body B, and a waterproofing adapter that gives a waterproof construction to the mount on the outer circumference of said flange as well as to a regular interchangeable lens unit is mounted to the lens unit. In this way, non-waterproof lenses may be mounted to the camera body having a waterproof construction, and even where regular non-waterproof interchangeable lens units are mounted to the camera body having a waterproof construction, the camera as a whole may easily be made waterproof. Furthermore, since the mount on the outer circumference of the flange of the lens mount of the camera body is of a waterproof construction, the camera may be reliably made waterproof even where it is an autofocus camera in which a transmission coupler for autofocusing is attached to the flange.

Figure 4:
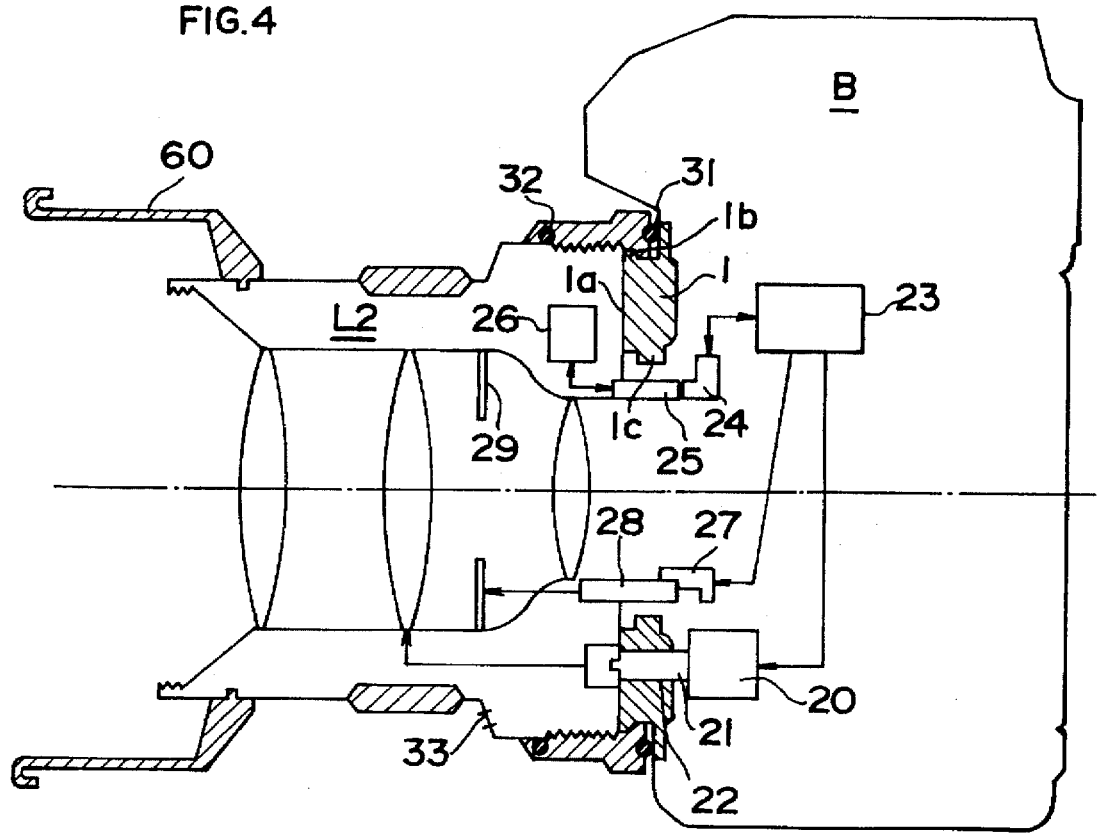
FIG. 4 is a cross-sectional view that shows the construction of a waterproof camera of a second embodiment according to the present invention.

FIG. 4 is a cross-sectional view that shows the construction of a waterproof camera of a second embodiment according to the present invention. It shows the situation in which waterproof lens unit L2 having a waterproof construction is mounted to camera body B having lens mount 1 with a construction that is identical to that in the first embodiment described above. Waterproof lens unit L2 is mounted to camera body B solely by means of mount 1b of lens mount 1 of camera body B. Packing 31 and 32 respectively comprising an O-ring, etc., are located on waterproof lens unit L2 to prevent water from penetrating the area where camera body B and lens unit L2 are connected. Furthermore, hole 33 for pressure adjustment within lens unit L2 is formed on waterproof lens unit L2. This hole 33 is sealed by an air-permeable and waterproof sheet. Incidentally, where pressure adjustment hole 33 is formed on the camera body B side, problems such as deformation of the focal plane shutter screen (not shown in the drawings) caused by changes in air pressure can occur. In addition, because it is not necessary to form hole 33 in a lens unit whose volume does not change (e.g., inner focus, etc.), the camera's waterproofing capability is even stronger. Waterproofing hood 60 has the same construction as waterproofing hood 6 of waterproofing adapter A as shown in FIG. 1.

In the waterproof camera of the second embodiment above, because lens unit L2 is connected to camera body B by means of mount 1b on the outer circumference of the flange of the lens mount of the camera body B, packing 31 of lens unit L2 adheres tightly to the area where the lens unit and the camera body are connected via the strength of the connection between lens unit L2 and camera body B, and sufficient waterproofing may be obtained. Furthermore, because the mount on the outer circumference of the flange is given a waterproof construction, reliable waterproofing is obtained even where a transmission coupler for autofocusing is mounted to the flange.

In addition, with respect to the camera body B of the first and second embodiments, by means of waterproofing adapter A, either waterproof lenses or lenses that do not have a waterproof construction may be mounted to the camera, and the camera as a whole may be made waterproof.

Figure 2:
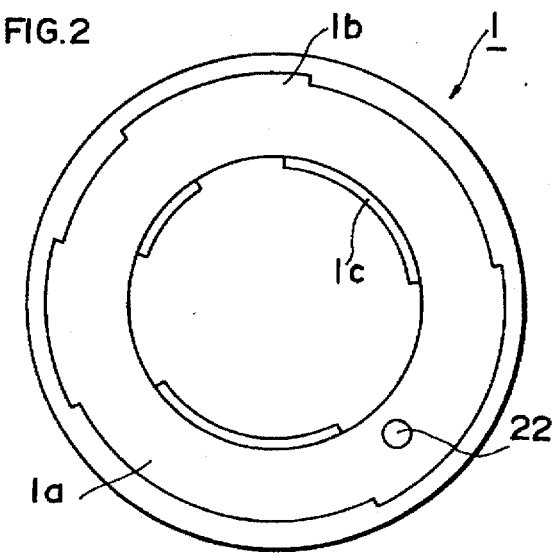
FIG. 2 is a front elevation of a lens mount of the waterproof camera as shown in FIG. 1.
Figure 5:
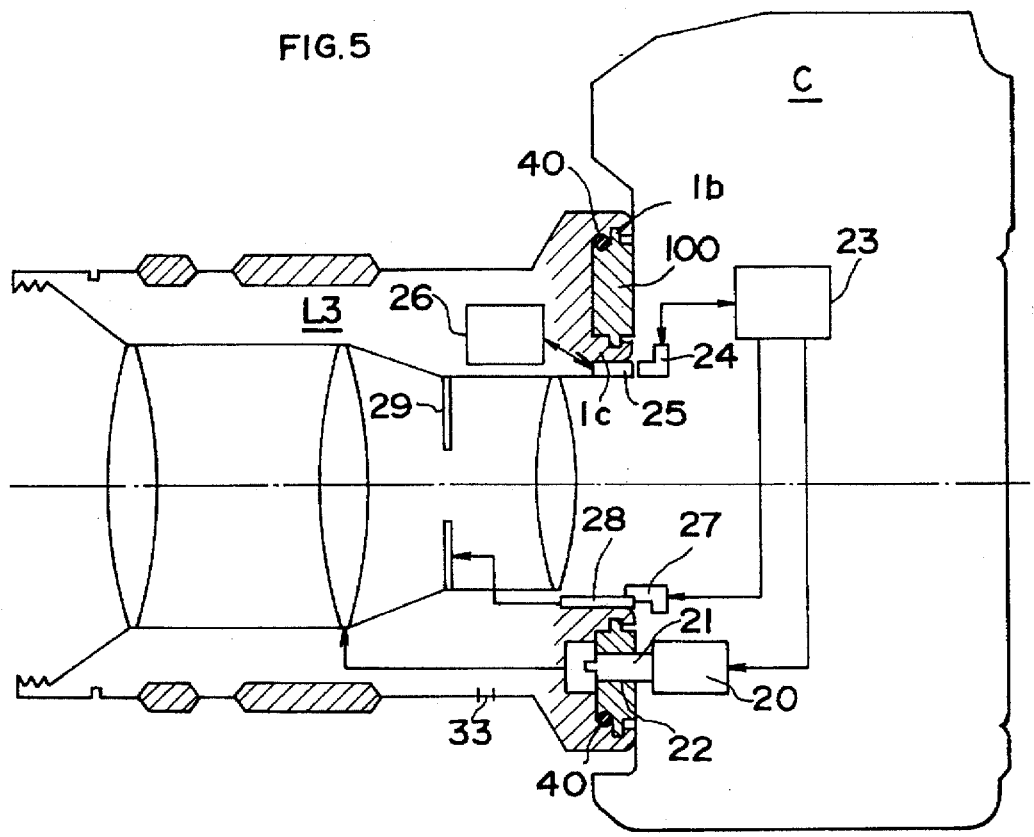
FIG. 5 is a cross-sectional view that shows a situation in which a waterproof lens unit is mounted to the body of a waterproof camera of a third embodiment according to the present invention.
Figure 6:
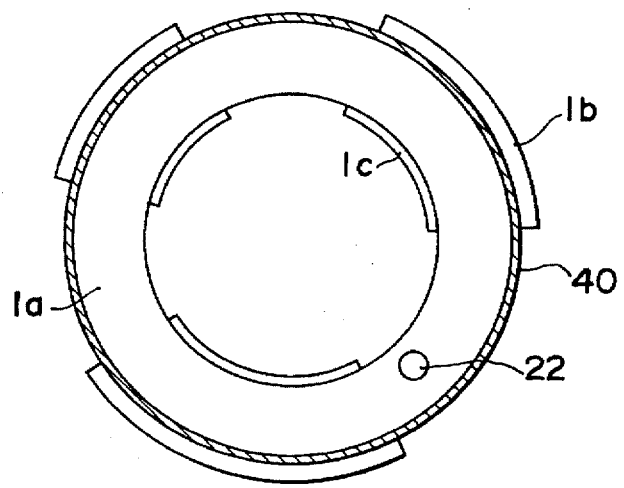
FIG. 6 is a front elevation of the lens mount of the waterproof camera as shown in FIG. 5.

FIG. 5 is a cross-sectional view showing a situation in which waterproof lens unit L3 is mounted to camera body C of a waterproof camera of a third embodiment according to the present invention. FIG. 6 is a front elevation of lens mount 100 of said waterproof camera. Camera body C has a waterproof construction, and lens unit L3 having a waterproof construction, except for the area where it is mounted to camera body C, is attached to lens mount 100. Just as in the first embodiment as shown in FIGS. 1 and 2, mounts 1b and 1c are formed on the outer and inner circumferences of flange 1a of lens mount 100. Mounts 1b and 1c are both bayonet mounts. Packing 40 comprising an O-ring, etc. is located on mount 1b as shown in FIG. 6, and water penetration from lens mount 100 is prevented by this packing 40. Because lens unit L3 is mounted to camera body C through engagement with both mounts 1b and 1c of lens mount 100, the connection between camera body C and lens unit L3 is very strong. The constructions and operations of various members including computing unit 23, motor 20, communication contact points 24 and aperture control lever 27 located in camera body C are the same as in the first embodiment shown in FIG. 1.

Lens unit L3 is mounted to camera body C through engagement with both mounts 1b and 1c of lens mount 100 in the third embodiment above, but lens unit L3 may also be mounted to camera body C by means of mount 1b only.

Figure 7:
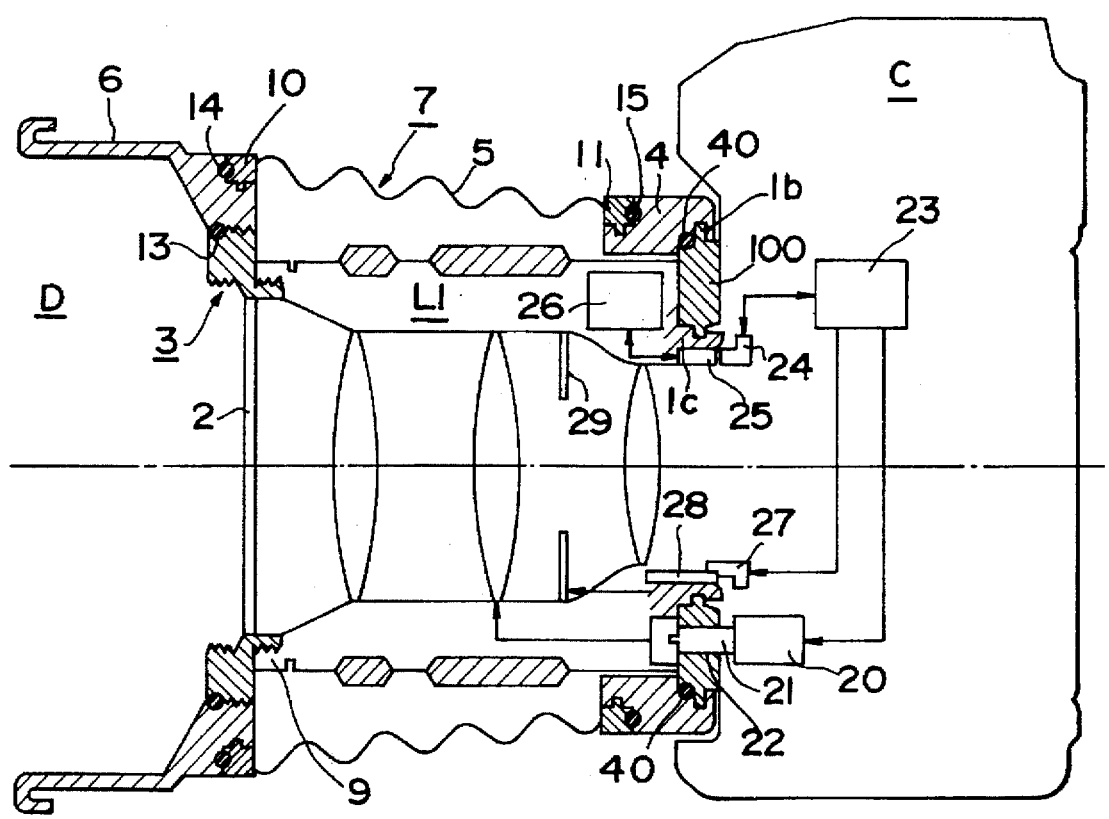
FIG. 7 is a cross-sectional view that shows the construction of a waterproof camera of a fourth embodiment according to the present invention.

FIG. 7 shows a situation in which a regular interchangeable lens unit not having a waterproof construction and waterproofing adapter D are attached to camera body C of a waterproof camera of a fourth embodiment according to the present invention. Camera body C has a lens mount 100 of the same construction as camera body C of the third embodiment shown in FIG. 5. Lens unit L1 is mounted to camera body C by engaging with mount 1c on the inner circumference of lens mount 1. In this embodiment, because packing 40 is attached to mount 1b as shown in FIG. 6, waterproof mount 4 of the adapter D has packing 15 only and there is no need to use packing that closely adheres to mount 1b on the outer circumference of the flange of the lens mount 1 as in the case of waterproofing adaptor A shown in FIG. 1. With this exception, waterproofing adapter D has the same construction as waterproofing adapter A. The attachment of lens adapter unit 3 is performed in the same way as in FIG. 1.

In this way, by mounting a regular interchangeable lens unit using the inner circumference of the flange of the lens mount of camera body C, and by giving a waterproof construction to the mount on the outer circumference of the flange, as well as by placing a waterproofing adapter over the regular interchangeable lens unit, non-waterproof lenses may by mounted to the camera body and the camera as a whole may be made waterproof.

Furthermore, by using a waterproofing adapter, either waterproof lenses or lenses not having a waterproof construction may be mounted to camera body C of the waterproof camera of the third and fourth embodiments, and camera as a whole may be made waterproof.

Figure 8:
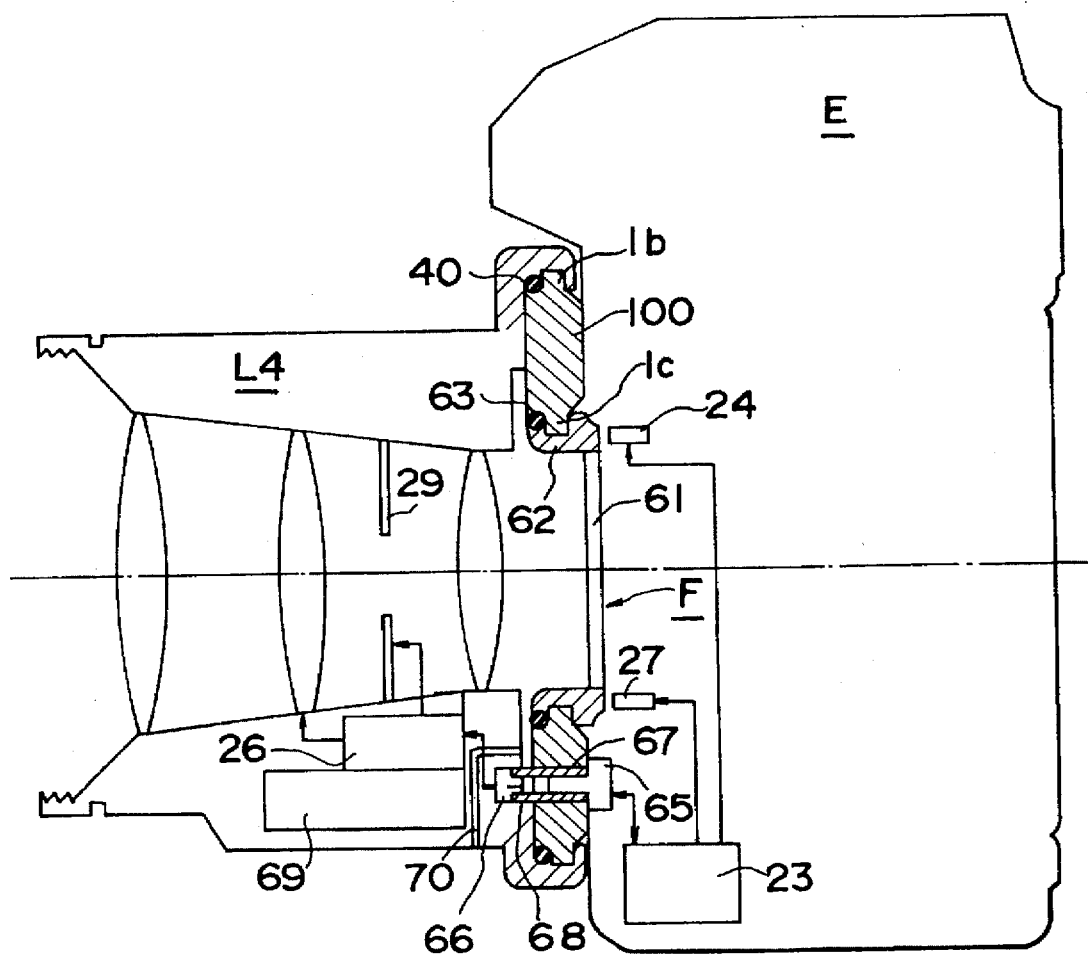
FIG. 8 is a cross-sectional view that shows a situation in which a special waterproof lens unit is mounted to the body of a waterproof camera of a fifth embodiment according to the present invention.

FIG. 8 is a cross-sectional view showing a situation in which special waterproof lens unit L4 is mounted to camera body E of a waterproof camera of a fifth embodiment according to the present invention. Instead of having a transmission coupler for autofocusing connected to the lens mount flange, camera body E in FIG. 8 has an optical communication device in its place. With this exception, camera body E has the same construction as camera body D in the fourth embodiment in FIG. 7. Waterproof protective cap F is attached to mount 1c of lens mount 100. Waterproof protective cap F comprises protective lens 61, mount engagement member 62 and packing 63 such as an O-ring, and by connecting mount engagement member 62 to mount 1c, mount 1c also obtains a waterproof construction due to packing 63. Therefore, by attaching waterproof protective cap F to camera body E, camera body E may be reliably made waterproof where no lens is mounted to the camera. Because waterproof protective cap F is attached to camera body E, only special waterproof lens unit L4 can be mounted to camera body E in this embodiment.

When waterproof lens unit L4 and waterproof protective cap F are mounted to camera body E, the communication of information between waterproof lens unit L4 and camera body E is performed via optical communication. Specifically, optical communication is performed by optical communication member 65 connected to computing unit 23 on the camera body E side and optical communication member 66 connected to computing unit 26 on the Waterproof lens unit L4 side. Optical communication members 65 and 66 are also waterproofed by means of packing 67 and 68 such as an O-ring, etc. Power source 69 for lens drive is located on the lens unit side. The transmission of information from the camera body E side to the lens unit L4 side makes the performance of aperture control and focusing control by computing unit 26 on the lens unit L4 side possible. In addition, water expulsion hole 70 is formed in order to expel water trapped between waterproof lens unit L4 and waterproof protective cap F when lenses are changed underwater.

Moreover, instead of optical communication, magnetic communication may also be used to transmit information between camera body E and lens unit L4. Furthermore, power source 69 need not necessarily be mounted on the lens unit; a power source may be mounted on the camera body E side, and a non-contact power feed to lens unit L4 may be performed via eddy-current, etc.

Because in the waterproof camera of the various embodiments described above mount 1b for mounting a waterproofing adapter or a waterproof lens unit is mounted on the outer circumference of flange 1a of the lens mount and mount 1c for mounting a regular interchangeable lens unit is mounted on the inner circumference of flange 1a, either a waterproof lens or a conventional lens unit not having a waterproof construction may be mounted to the camera body. Even where an interchangeable lens unit not having a waterproof construction is mounted to the camera body, the camera as a whole may be made waterproof by attaching a waterproofing adapter to mount 1b. Furthermore, because mount 1b is given a waterproof construction, said mount 1b being located farther out on the outer circumference of the lens mount of the autofocus camera body than autofocus coupler 21 on the flange of the lens mount, penetration of water from autofocus coupler 21 may be prevented. In addition, by connecting waterproof protective cap F to mount 1c, lenses may be changed underwater or in the rain.

The present invention is not limited to the constructions described in the above embodiments, and various other configurations are possible. The waterproof construction described above using the outer circumference of the mount may be similarly applied in a mount adapter that can be placed between the camera body and the lens unit.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A waterproof camera to which an interchangeable lens unit having a waterproof construction is mounted, said waterproof camera comprising:

a lens mount provided in a camera body and to which the interchangeable lens unit is removably mounted, said lens mount including a ring-shaped flange which positions the interchangeable lens unit relative to the camera body, and an engaging member provided at an outer circumference of the ring-shaped flange and which engages with one end of the interchangeable lens unit, so that the interchangeable lens unit is connected to the camera body; and a waterproof member which is in pressing contact between said engaging member and said one end of the interchangeable lens unit at an area of engagement between them, and prevents water from penetrating in said area of engagement.

2. A waterproof camera as claimed in claim 1 wherein said waterproof member is provided at the outer circumference of the ring-shaped flange.

3. A waterproof camera as claimed in claim 1 wherein said waterproof member is provided at said one end of the interchangeable lens unit.

4. A waterproof camera as claimed in claim 1 wherein the interchangeable lens unit includes an inner tube portion including an optical system, and an outer tube portion supporting said inner tube portion inside thereof and having a waterproof construction, said outer tube portion engaging with the engaging member.

5. A waterproof camera as claimed in claim 4 further comprising:

a second engaging member provided at an inner circumference of the ring-shaped flange, said inner tube portion of the interchangeable lens unit engaging with said second engaging member.

6. A waterproof camera as claimed in claim 5 wherein said outer tube portion of the interchangeable lens unit includes a protective lens attached to a front surface of the inner tube portion, a waterproofing hood attached at an outer circumference of the front surface of the inner tube portion for preventing water from penetrating on a surface of the protective lens, a waterproof mount engageable with the second engaging member, and waterproof sheet provided between the waterproof mount and the waterproof hood and covering around the inner tube portion.

7. A waterproof camera to which an interchangeable lens unit is mounted, comprising:

a lens mount provided in a camera body and to which the interchangeable lens unit is removably mounted, said lens mount including a ring-shaped flange which positions the interchangeable lens unit relative to the camera body, a first engaging member provided at an inner circumference of the ring-shaped flange and which engages with one end of the interchangeable lens unit, so that the interchangeable lens unit is connected to the camera body, and a second engaging member provided at an outer circumference of the ring-shaped flange; and a waterproof structure having an engaging member which engages with the lens unit to be removably mounted to the interchangeable lens unit and which prevents water from penetrating in a front surface of the interchangeable lens unit and around the interchangeable lens unit, said waterproof structure engaging with said second engaging member while being attached to the interchangeable lens unit so that the camera as a whole is made waterproof.

8. A waterproof camera as claimed in claim 7 wherein a waterproof member is provided at said second engaging member of the camera body and is in pressing contact between the waterproof structure and the camera body at an area of engagement between them, and prevents water from penetrating in said area of engagement.

9. A waterproof camera as claimed in claim 7 wherein said interchangeable lens unit has an outer tube portion which forms said waterproof structure and an inner tube portion, and said outer tube portion of the interchangeable lens unit includes a protective lens attached to a front surface of the inner tube portion, a waterproofing hood attached at an outer circumference of the front surface of the inner tube portion for preventing water from penetrating in a surface of the protective lens, a waterproof mount engageable with the second engaging member, and waterproof sheet provided between the waterproof mount and the waterproof hood and covering the inner tube portion.

10. A waterproof camera as claimed in claim 9 wherein a waterproof member is provided at said waterproof mount so as to be in pressing contact with an area of engagement between the waterproof mount and the second engaging member.

11. A mount mechanism in a waterproof camera to which an interchangeable lens unit is attached, said interchangeable lens unit composed of an inner tube portion including an optical system, and outer tube portion supporting the inner tube portion inside thereof and having a waterproof construction, said mount mechanism comprising:

a ring-shaped flange which positions the interchangeable lens unit relative to a camera body;

an engaging member provided at an outer circumference of said flange and which engages with the outer tube portion of the interchangeable lens unit so that the interchangeable lens unit is connected to the camera body; and a waterproof member provided at the outer circumference of the flange and which is in pressing contact with an area of engagement between the outer tube portion of the interchangeable lens unit and the engaging member and prevents water from penetrating in said area of engagement.

12. A mount mechanism as claimed in claim 11 wherein the engagement between said outer tube portion and said engaging member is provided at the outer circumference of the ring-shaped flange via said waterproof member.

13. A mount mechanism as claimed in claim 12 wherein said waterproof member is formed of an elastic member.

14. A mount mechanism as claimed in claim 11 further comprising:

a second engaging member provided at an inner circumference of the ring-shaped flange and which engages with the inner tube portion of the interchangeable lens unit.

15. A mount mechanism as claimed in claim 14 wherein the inner tube portion of the interchangeable lens unit is an interchangeable lens unit having no waterproof construction, and the outer tube portion of the interchangeable lens unit is a waterproof adapter for preventing water from penetrating in a front surface of the inner tube portion and around the inner tube portion.

16. A mount mechanism as claimed in claim 14 further comprising:

a protective cap which engages with said second engaging member and prevents water from penetrating into the camera body through the ring-shaped flange.

17. A mount mechanism in a waterproof camera to which an interchangeable lens unit having a waterproof member at one end thereof is attached, said mount mechanism comprising:

a lens mount including a ring-shaped flange which positions the interchangeable lens unit relative to the camera body; and an engaging member provided at an outer circumference of the ring-shaped flange and which engages with the interchangeable lens unit via the waterproof member of the interchangeable lens unit so that the interchangeable lens unit is connected to the camera body.

18. A mount mechanism as claimed in claim 17 wherein said engaging member engages with the interchangeable lens unit through a ring-shaped elastic member provided on the interchangeable lens unit.

19. A waterproof adapter attached to an interchangeable lens unit mountable to a waterproof camera so that the camera as a whole is made waterproof, said waterproof adapter comprising:

a protective lens attached to a front surface of the interchangeable lens unit;

a waterproof hood provided at an outer circumference of the front surface of the interchangeable lens unit and which prevents water from penetrating into the protective lens;

a waterproof mount which has an engaging member which engages with the lens unit to be removably mounted thereon, and which engages with a lens mount of a camera body; and a waterproof sheet provided between the waterproof mount and the waterproof hood and which covers the interchangeable lens unit.

20. A waterproof adapter as claimed in claim 19 wherein said waterproof hood is openable.

21. A mount mechanism in a waterproof camera comprising:

a first lens mount having a first diameter and to which an interchangeable lens unit having no waterproof construction can be attached; and a second lens mount having a second diameter and to which an interchangeable lens unit having a waterproof construction or a waterproof adapter attached to an interchangeable lens unit having no waterproof construction can be attached, the first diameter of the first lens mount being smaller than the second diameter of the second lens mount.

22. A mechanism as claimed in claim 21 wherein a waterproof member is provided adjacently to the second lens mount.

23. A mechanism as claimed in claim 21 wherein a waterproof member is provided on said waterproof adapter or on one end of the interchangeable lens unit having a waterproof construction.

\* \* \* \* \*